(12) United States Patent
Metcalf et al.

(10) Patent No.: US 8,549,804 B2
(45) Date of Patent: Oct. 8, 2013

(54) OFFICE PARTITION ELECTRICAL SYSTEM

(75) Inventors: Keith E. Metcalf, Jasper, IN (US); Bart J. Cooper, Petersburg, IN (US); Jay M. Henriott, Jasper, IN (US)

(73) Assignee: Kimball International, Inc., Jasper, IN (US)

( * ) Notice: Subject to any disclaimer, the term of this patent is extended or adjusted under 35 U.S.C. 154(b) by 94 days.

(21) Appl. No.: 12/909,503

(22) Filed: Oct. 21, 2010

(65) Prior Publication Data
US 2012/0096780 A1  Apr. 26, 2012

(51) Int. Cl.
*E04H 1/00* (2006.01)

(52) U.S. Cl.
USPC ............... 52/239; 52/36.1; 52/220.7; 52/241; 52/481.2; 439/215

(58) Field of Classification Search
USPC ............ 52/36.1, 239, 241–243, 220.7, 481.2, 52/238.1; 439/214, 215, 650
See application file for complete search history.

(56) References Cited

U.S. PATENT DOCUMENTS

| | | | |
|---|---|---|---|
| 3,462,892 A * | 8/1969 | Meyer | 52/28 |
| 4,631,881 A * | 12/1986 | Charman | 52/220.7 |
| 4,646,211 A | 2/1987 | Gallant et al. | |
| 4,682,457 A * | 7/1987 | Spencer | 52/239 |
| 4,685,255 A | 8/1987 | Kelley | |
| 4,874,322 A | 10/1989 | Dola et al. | |
| 5,065,556 A * | 11/1991 | DeLong et al. | 52/220.7 |
| 5,092,786 A | 3/1992 | Juhlin et al. | |
| 5,158,472 A | 10/1992 | Juhlin | |
| 5,236,370 A | 8/1993 | King et al. | |
| 5,406,760 A | 4/1995 | Edwards | |
| 5,562,469 A * | 10/1996 | Nienhuis et al. | 439/215 |
| 5,670,743 A * | 9/1997 | Welch et al. | 174/377 |
| 5,675,949 A | 10/1997 | Forslund et al. | |
| 5,804,763 A | 9/1998 | Smeenge | |
| 5,806,258 A | 9/1998 | Miedema et al. | |
| 5,826,385 A * | 10/1998 | Dykstra et al. | 52/220.7 |
| 5,839,240 A * | 11/1998 | Elsholz et al. | 52/242 |
| 5,873,553 A | 2/1999 | Stahl et al. | |
| 5,899,035 A | 5/1999 | Waalkes et al. | |

(Continued)

FOREIGN PATENT DOCUMENTS

DE   41 08 082   9/1992
GB   2 101 175   1/1983

(Continued)

OTHER PUBLICATIONS

Kimball Product Information, "Xsite Power/Data Tile and Components", at least as early as Apr. 2007.

(Continued)

*Primary Examiner* — Brian Glessner
*Assistant Examiner* — Adriana Figueroa
(74) *Attorney, Agent, or Firm* — Faegre Baker Daniels LLP

(57) ABSTRACT

An electrical service assembly is secured to a framework of a panel of an office partition system and includes at least one bracket to which at least one electrical outlet module is mounted, the module having at least a pair of electrical outlets such that electrical outlets may be positioned in a back-to-back configuration. In this manner, the electrical service assembly provides service to opposite sides of a panel that face opposite work spaces. Also, the electrical outlet modules may be associated with separate circuits to prevent overload of the electrical service assembly.

6 Claims, 14 Drawing Sheets

(56) References Cited

U.S. PATENT DOCUMENTS

| | | | |
|---|---|---|---|
| 5,913,787 A | | 6/1999 | Edwards |
| 5,921,040 A * | | 7/1999 | Glashouwer et al. ........... 52/239 |
| 6,023,893 A | | 2/2000 | Tanaka |
| 6,079,173 A | | 6/2000 | Waalkes et al. |
| 6,098,358 A | | 8/2000 | Waalkes et al. |
| 6,158,180 A * | | 12/2000 | Edwards ....................... 52/220.7 |
| 6,173,536 B1 * | | 1/2001 | Boyce ............................ 52/36.4 |
| 6,223,478 B1 * | | 5/2001 | Wheeler ........................ 52/36.1 |
| 6,230,459 B1 | | 5/2001 | Jeffers et al. |
| 6,253,509 B1 * | | 7/2001 | Hellwig et al. ................. 52/239 |
| 6,260,324 B1 | | 7/2001 | Miedema et al. |
| 6,349,516 B1 | | 2/2002 | Powell et al. |
| 6,575,777 B2 * | | 6/2003 | Henriott et al. ............... 439/215 |
| 6,591,563 B2 | | 7/2003 | King et al. |
| 6,745,525 B2 * | | 6/2004 | High ............................ 52/220.7 |
| 6,851,226 B2 | | 2/2005 | MacGregor et al. |
| 6,888,277 B2 | | 5/2005 | Watzek et al. |
| 7,150,127 B2 * | | 12/2006 | Underwood et al. .......... 52/36.1 |
| 7,210,270 B1 | | 5/2007 | King et al |
| 7,614,896 B2 * | | 11/2009 | Johnson et al. ............... 439/215 |
| 7,651,353 B2 | | 1/2010 | Laukhuf |
| 7,871,280 B2 | | 1/2011 | Henriott |
| 7,908,805 B2 | | 3/2011 | Metcalf et al. |
| 2001/0037890 A1 | | 11/2001 | Ospina |

FOREIGN PATENT DOCUMENTS

| | | |
|---|---|---|
| JP | 8-13664 | 1/1996 |
| JP | 8-209823 | 8/1996 |
| JP | 9-137531 | 5/1997 |
| JP | 10-136532 | 5/1998 |
| JP | 11-210129 | 8/1999 |
| JP | 2008-5687 | 1/2008 |

OTHER PUBLICATIONS

Kimball Product Information, "Xsite Base Wireway Harness", at least as early as Apr. 2007.

Herman Miller Product Information "Ethospace System" at least as early as Apr. 2007.

Herman Miller Product Information "Action Office System" at least as early as Apr. 2007.

Teknion Product Information "Boulevard" at least as early as Apr. 2007.

Teknion Product Information "Leverage" at least as early as Apr. 2007.

Steelcase Product Information "Answer System Solutions" at least as early as Apr. 2007.

* cited by examiner

FIG_7

OFFICE PARTITION ELECTRICAL SYSTEM

BACKGROUND

1. Field of the Invention

The present invention relates to partition systems of the type used in office spaces, and more particularly, to a movable and reconfigurable office partition system for subdividing an office space, including a framework to which decorative and/or functional tiles are attached. An electrical system is selectively attachable to the framework and is accessible externally from the framework to provide electricity to individual work spaces defined by the partition system.

2. Description of the Related Art

Partition systems, which are used to divide interior office spaces, typically include a plurality of panels, each having a rectangular frame formed from vertical and horizontal frame members rigidly connected to one another. Panel tiles are mounted to the rectangular frames to cover the frames and to subdivide the office space into individual spaces such as work stations, conference rooms, and the like. Typically, the individual panels in the system are connected by attaching the rectangular frames of adjacent panels together along the side edges of the rectangular frames.

In one known system, electrical system components, such as electrical outlet modules, are integrated with, or mounted directly to, the tiles of the partition system as opposed to the framework of the partition system. In this manner, the electrical outlet modules are installed when the tiles are mounted to the framework. In some applications, it may be desirable to more securely mount the electrical outlet modules with respect to the frames.

Further, typical electrical systems for office partition systems have a limited number of electrical outlet modules spaced along a panel, such as, for example, only two electrical outlet modules disposed along a panel measuring four feet in width. However, a large number of electrical outlet modules positioned along such a panel may potentially draw too much current on a single circuit.

What is needed is a partition system for office spaces which is an improvement over the foregoing.

SUMMARY

The present disclosure provides a electrical service assembly secured to a framework of a panel of an office partition system and including at least one bracket to which at least one electrical outlet module is mounted, the module having at least a pair of electrical outlets such that electrical outlets are positioned in a back-to-back configuration. In this manner, the electrical service assembly provides service to opposite sides of a panel that face opposite work spaces. Also, the electrical outlet modules may be associated with separate circuits to prevent overload of the electrical service assembly.

In one form thereof, the present disclosure provides an office partition system, including a panel frame including a pair of vertical frame members, a top horizontal frame member connecting upper ends of the pair of vertical frame members, and a bottom horizontal frame member connecting lower ends of the pair of vertical frame members, at least one cover tile removably mounted to the panel frame, a pair of vertically spaced intermediate horizontal frame members connected between the pair of vertical frame members, a plurality of brackets disposed between and secured to the pair of intermediate horizontal frame members, and a plurality of electrical outlet modules respectively connected to the brackets, the electrical outlet modules accessible from externally of the panel frame.

In another form thereof, the present disclosure provides an office partition system, including a panel frame including a pair of vertical frame members, a top horizontal frame member connecting upper ends of the pair of vertical frame members, and a bottom horizontal frame member connecting lower ends of the pair of vertical frame members, at least one cover tile removably mounted to the panel frame, and an electrical service assembly, including a pair of spaced intermediate horizontal frame members connected to and disposed between the pair of vertical frame members, a plurality of brackets disposed between the pair of intermediate horizontal frame members, and a plurality of electrical outlet modules connected to respective the brackets and accessible from externally of the panel frame, the modules electrically connected to one another and including a first electrical outlet module comprising a housing, a plurality of electrical conductors extending through the housing, and at least one first electrical outlet receptacle electrically connected with a first configuration of the conductors whereby the at least one first electrical outlet receptacle is associated with a first circuit, and a second electrical outlet module comprising a housing, a plurality of electrical conductors extending through the housing, and at least one second electrical outlet receptacle electrically connected with a second configuration of the conductors different from the first configuration whereby the at least one second electrical outlet receptacle is associated with a second circuit.

In yet another form thereof, the present disclosure provides an office partition system, including a substantially rectangular panel frame including a pair of vertical frame members, a top horizontal frame member disposed between upper ends of the pair of vertical frame members, and a bottom horizontal frame member disposed between lower ends of the pair of vertical frame members, at least a first cover tile removably mounted to a first side of the panel frame, at least a second cover tile removably mounted to a second, opposite side of the panel frame, and an electrical service assembly including an elongate horizontal bracket extending between and secured at opposite ends thereof to the pair of vertical frame members, a plurality of electrical outlet modules mounted to the elongate horizontal bracket, and a pair of header tiles mounted on respective opposite sides of the elongate horizontal bracket, the header tiles including apertures respectively aligned with the plurality of electrical outlet modules whereby the electrical outlet modules are accessible from externally of the panel frame.

BRIEF DESCRIPTION OF THE DRAWINGS

The above-mentioned and other features and advantages of this disclosure, and the manner of attaining them, will become more apparent and the invention itself will be better understood by reference to the following descriptions of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the disclosure in any manner.

DETAILED DESCRIPTION

The present disclosure provides an electrical service assembly that is secured to a framework of a panel of an office partition system, and may advantageously be secured at a level above a work surface for ease of access by a user. The electrical service assembly includes at least one bracket to which at least one electrical outlet module is mounted, the module having at least a pair of electrical outlets such that electrical outlets may be positioned in a back-to-back configuration. In this manner, the electrical service assembly provides service to opposite sides of a panel that face opposite work spaces. Also, the electrical outlet modules may be associated with separate circuits to prevent overload of the electrical service assembly.

Figure 1:
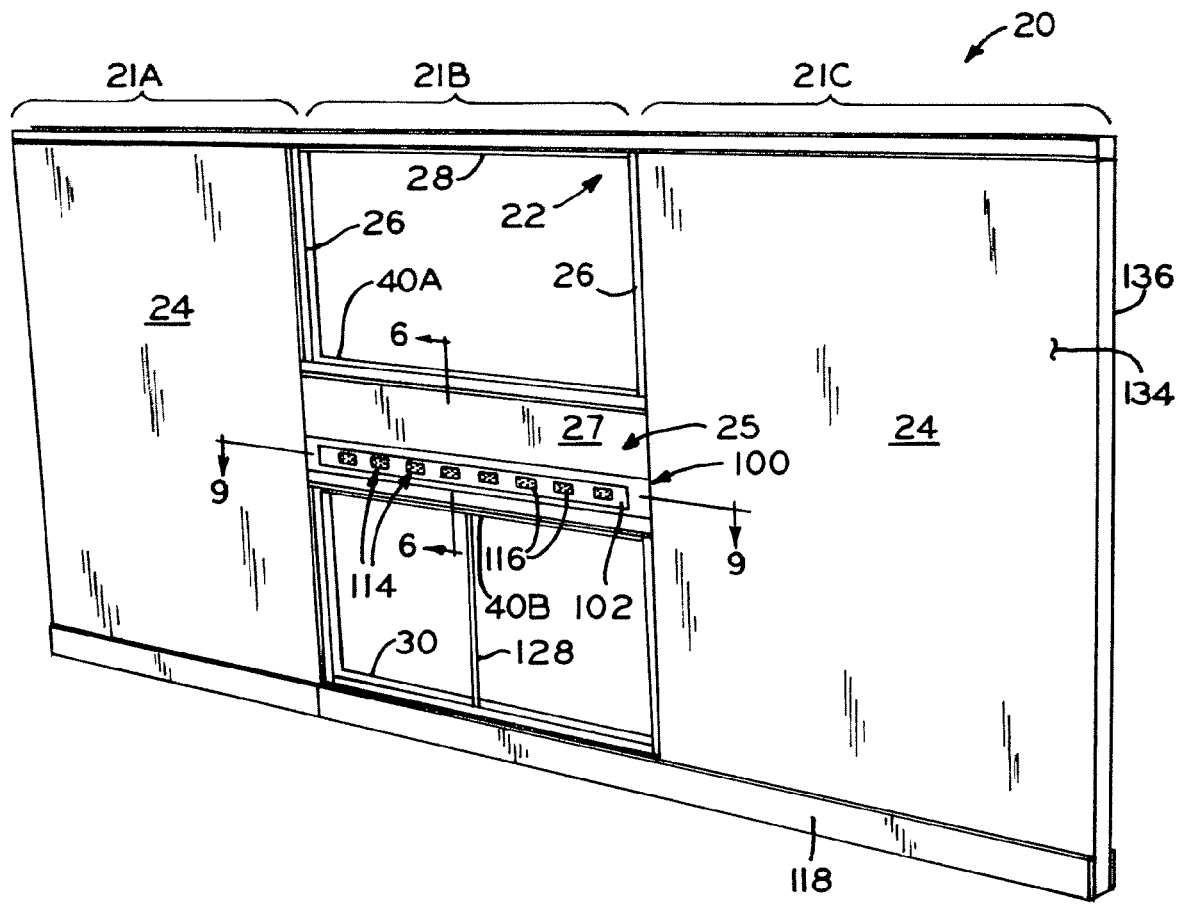
FIG. 1 is a perspective view of an exemplary partition system having a plurality of panels, with the central panel including a frame assembly and an electrical service assembly partially covered by a header tile according to an embodiment of the present invention.
Figure 2:
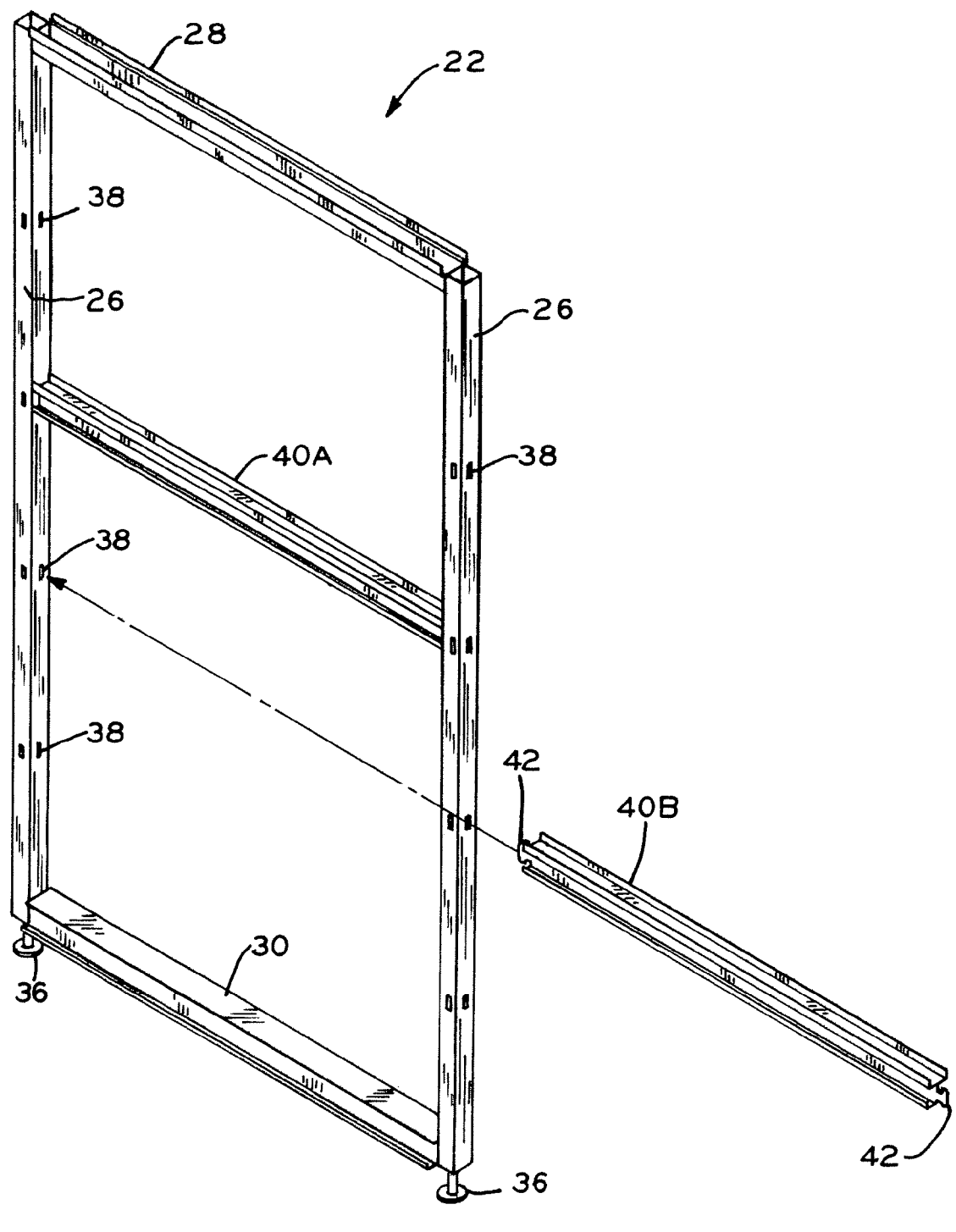
FIG. 2 is a perspective view of the frame assembly of the central panel of the partition system of FIG. 1, the frame assembly including a pair of intermediate horizontal frame members.

Referring to FIG. 1, partition system 20 is shown, of the type generally used in office spaces for dividing an interior office space into separate workspaces, such as work stations, conference rooms, reception rooms, and common areas, for example. Partition system 20 generally includes, as shown in FIG. 1, three panels 21A-C, including a central panel 21B connected between a pair of adjacent side panels 21A and 21C. As shown in FIG. 2, each panel includes a frame, framework, or structure 22 (FIG. 2), to which cover tiles, such as decorative and/or functional tiles, are mounted for dividing the interior office space and providing privacy between the individual spaces therein. Referring back to FIG. 1, the tiles attached to framework 22 may include decorative tiles 24, for example, as well as functional tiles as desired. Partition system 20 is free-standing upon the floor surface of an office space and, in some embodiments, is not connected to the permanent walls (not shown) of the building in which the office space is disposed. However, in a manner similar to that described in detail in U.S. patent application Ser. No. 12/351,219, now published as U.S. Patent App. Publ. No. 2009/0173016, assigned to the assignee of the present application, the disclosure of which is expressly incorporated herein by reference, partition system 20 may optionally be connected to permanent walls of a building in which partition system 20 is disposed.

Referring to FIG. 2, each panel frame 22 in partition system 20 generally includes vertical frame members 26 connected to one another by top and bottom horizontal frame members 28 and 30 to define individual rectangular-shaped framework sections. Particularly, top horizontal frame member 28 connects upper ends of a pair of vertical frame members 26 and bottom horizontal frame member 30 connects lower ends of the pair of vertical frame members 26. In many of the Figures herein, top and bottom horizontal frame members 28 and 30, respectively, are shown rigidly and permanently attached to vertical frame members 26 such as by welding, for example. However, top and bottom horizontal frame members 28 and 30, respectively, may also be detachably connected to vertical frame members 26 by suitable fasteners. As described in detail in U.S. patent application Ser. No. 12/351,219, incorporated by reference above, and as may be seen in FIGS. 3A and 3B, for example, top horizontal frame member 28 may define an upwardly-opening channel 32 and bottom horizontal frame member 30 may define a downwardly-opening channel 34. The lower ends of vertical frame members 26 may include a known level glide assembly with foot 36 (FIG. 2) mounted upon a threaded member and resting against a floor surface, wherein the distance between foot 36 and the bottom edge of vertical frame member 26 is vertically adjustable by rotating foot 36, such that frame 22 may be leveled along an uneven floor surface.

Vertical frame members 26 include a first mounting structure therealong, such as a plurality of vertical slots 38, located at spaced vertical intervals along vertical frame members 26, to which intermediate horizontal members 40 may be attached or removably connected to and positionable at a selected height along said vertical frame members 26 via second mounting structures such as tabs 42, as described below. Alternatively, the foregoing structural arrangement may be reversed, such that the first mounting structure may include tabs and the second mounting structure may include slots.

Figure 3A:
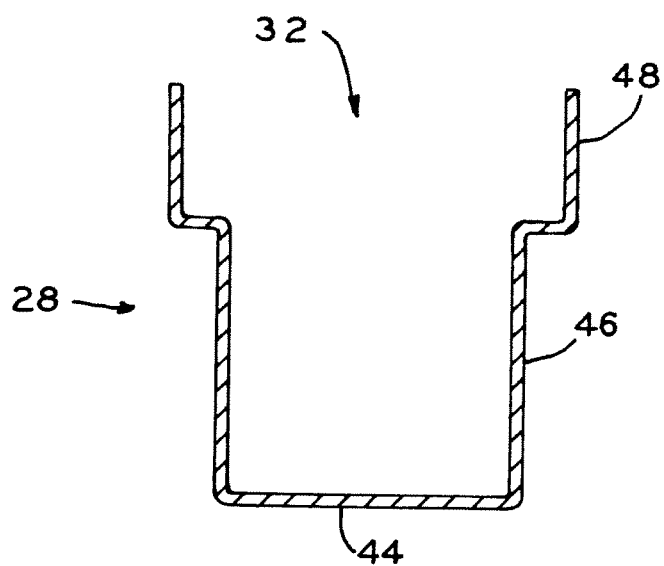
FIG. 3A is a cross-sectional view of an upper horizontal frame member of the frame assembly of FIG. 2.
Figure 3B:
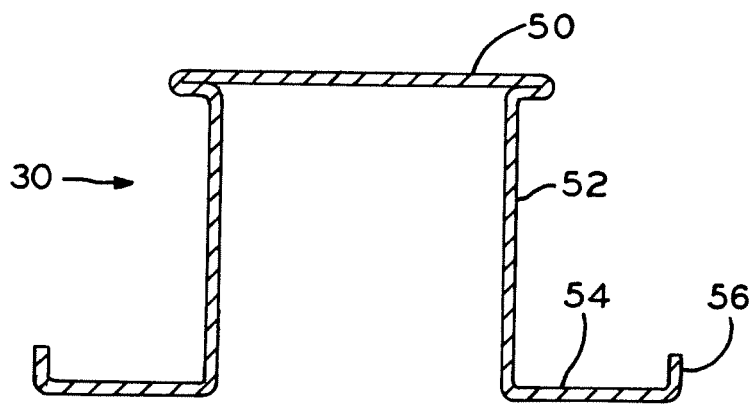
FIG. 3B is a cross-sectional view of a lower horizontal frame member of the frame assembly of FIG. 2.

Referring to FIG. 3A, top horizontal frame member 28 has a substantially upwardly directed C-shaped cross section, including base wall 44 and a pair of side walls 46 extending upwardly from base wall 44 which, together with base wall 44, define channel 32. A pair of track member mounting walls 48 are spaced laterally from, and extend upwardly from, side walls 46, respectively. Referring to FIG. 3B, bottom horizontal frame member 30 also has a generally downwardly directed C-shaped cross section, including base wall 50 and a pair of side walls 52 extending downwardly from base wall 50 which, together with base wall 50, define channel 34. Horizontal walls 54 extend horizontally from the lower ends of side walls 52, and terminate in upwardly-projecting ridges 56.

Figure 3C:
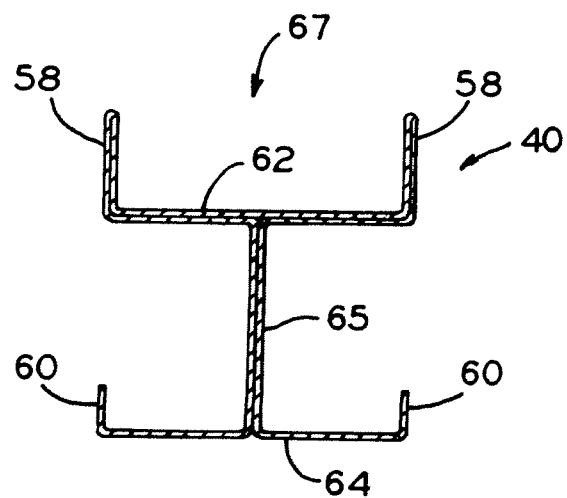
FIG. 3C is a cross-sectional view of an intermediate horizontal frame member of the frame assembly of FIG. 2.

Referring to FIG. 3C, intermediate horizontal frame members 40 each have a generally I-shaped cross section, and may be formed by a pair of bent metal pieces attached to one another in a back-to-back manner. An intermediate horizontal frame member 40, as shown in FIG. 3C, includes vertical track member mounting walls 58, upper horizontal wall 62, lower horizontal wall 64 connected to upper horizontal wall 62 via central web 65, and lower vertical walls 60 extending upwardly from lower horizontal wall 64. Referring to FIG. 2, intermediate horizontal frame members 40 are attached to vertical frame members 26 by first tilting intermediate horizontal frame members 40 upwardly to insert a tab 42 of one end of the intermediate horizontal frame member 40 into a selective one of a plurality of slots 38 of one of a pair of vertical frame members 26, followed by tilting intermediate horizontal frame member 40 downwardly to a horizontal position such that a tab 42 of the other end of the intermediate horizontal frame member 40 is inserted into an aligned and parallel slot 38 of the other vertical frame member 26. After insertion of an intermediate horizontal frame member 40 between and to vertical frame members 26, the ends of upper horizontal walls 62 and lower horizontal walls 64 of intermediate horizontal frame member 40 abut the faces of vertical frame members 26 adjacent slots 38. Intermediate horizontal frame members 40 may be removed by the opposite of the foregoing procedure. In this manner, intermediate horizontal frame members 40 may be firmly and rigidly, yet detachably, mounted to vertical frame members 26 at selected vertical intervals thereon defined by the locations of slots 38.

Figure 5:
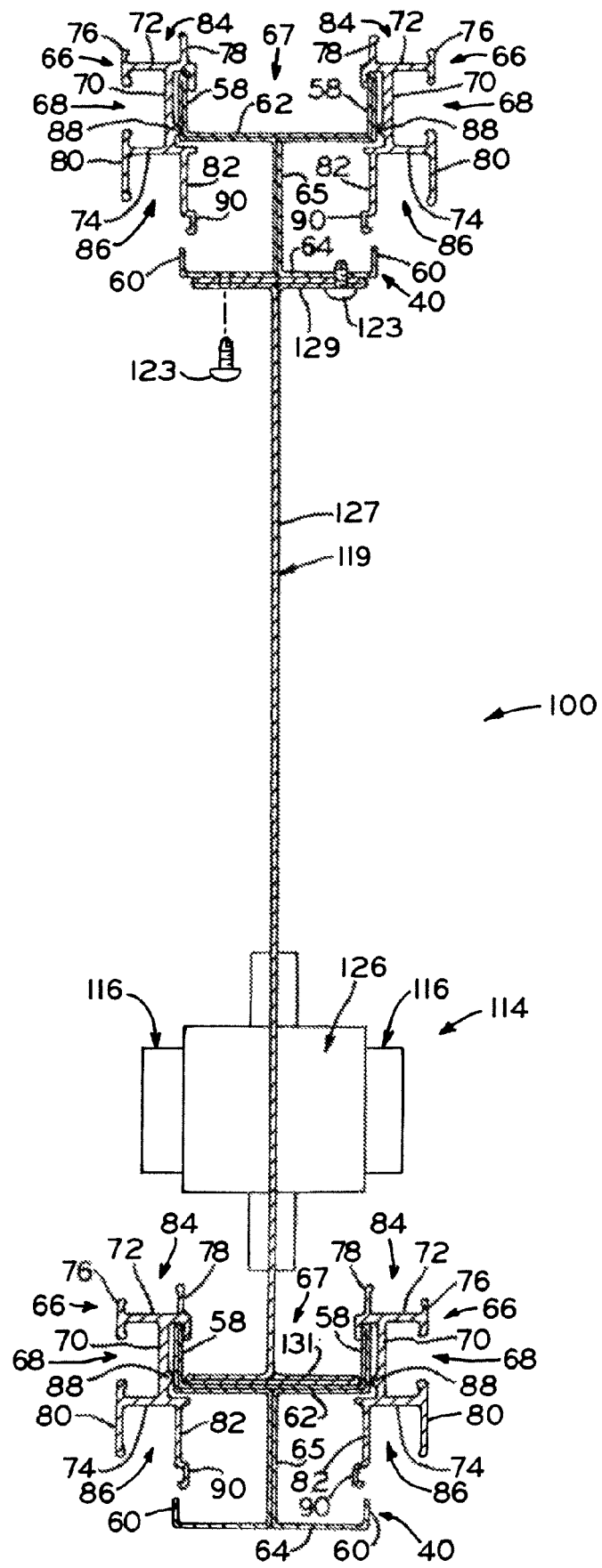
FIG. 5 is cross-sectional view of the electrical service assembly of the partition system, taken along line 5-5 of FIG. 4, further showing track members connected to the pair of intermediate horizontal frame members.
Figure 6:
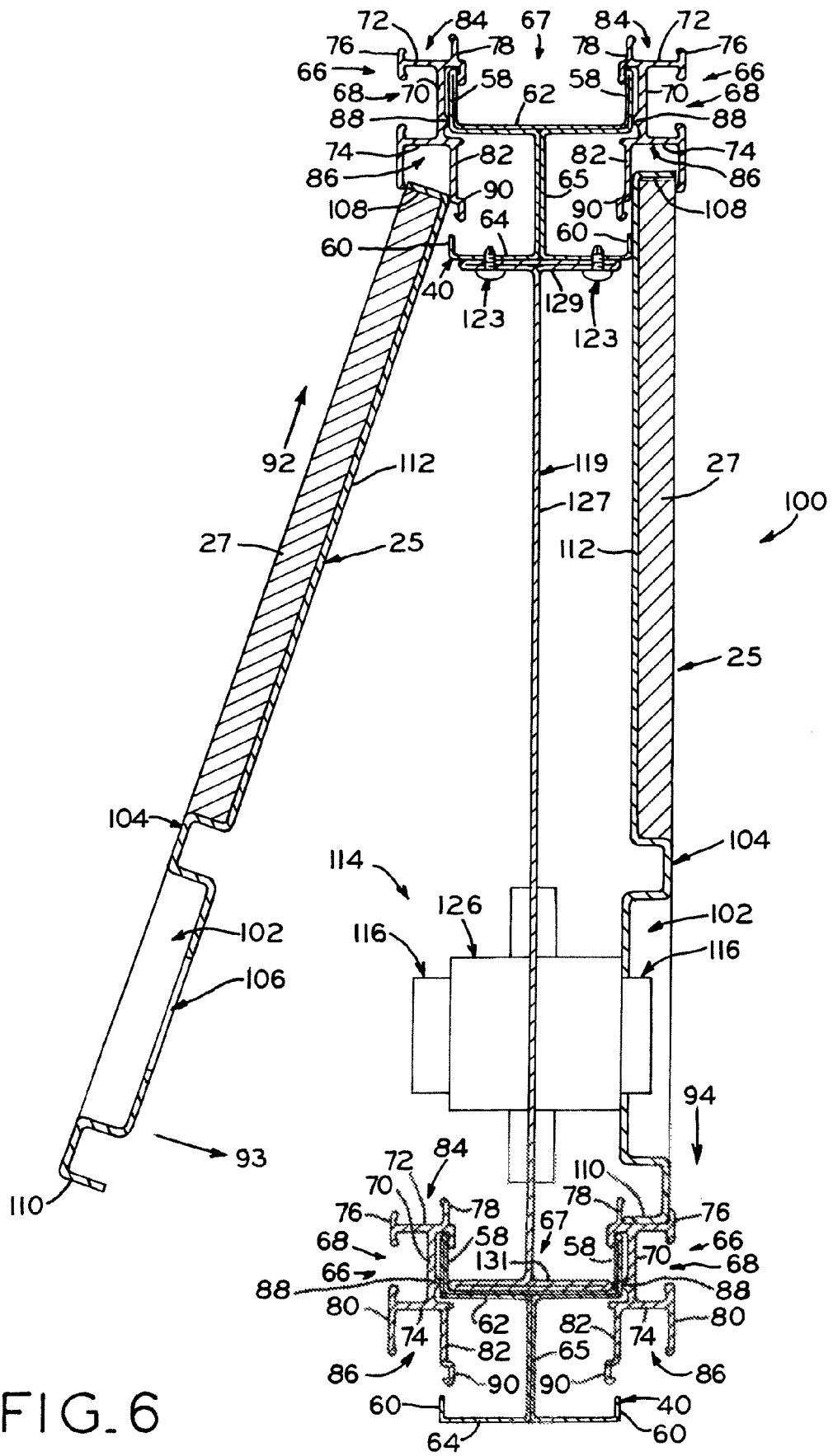
FIG. 6 is another cross-sectional view of the electrical service assembly of the partition system, taken along line 6-6 of FIG. 1, further showing a process of mounting a header tile between track members of the partition system.

As shown in FIGS. 5 and 6, track members 66 may be attached and/or mounted to intermediate horizontal frame members 40 to support the various components of partition system 20, such as decorative tiles 24, for example, as discussed below. Track member 66 is similar to those which are described in detail in U.S. Pat. No. 5,309,686 and in U.S. patent application Ser. No. 12/351,219, now published as U.S. Patent App. Publ. No. 2009/0173016, both assigned to the assignee of the present application, the disclosures of which are expressly incorporated herein by reference.

Track members 66 generally include an extruded metal section having a horizontally-opening channel 68 defined by rear wall 70 and upper and lower walls 72 and 74, respectively. Upper wall 72 terminates in upper front wall 76 and upper rear wall 78, and lower wall 74 terminates in lower front wall 80 and lower rear wall 82. Upper front wall 76, upper wall 72, and upper rear wall 78 define tile space 84 therebetween for receipt of the lower edge of a tile, such as tile 24 as a decorative or a functional tile, and lower front wall 80, lower wall 74, and lower rear wall 82 define tile space 86 therebetween for receipt of the upper edge of a tile. Track member 66 is mounted to intermediate horizontal frame member 40 in a fastenerless manner without the need for tools by engaging upper rear wall 78 of track member 66 over track member mounting wall 58 of intermediate horizontal frame member 40 such that spacing projections 88 of rear wall 70 of track member 66 abut track member mounting wall 58 of intermediate horizontal frame member 40. Track members 66 may be mounted to track member mounting walls 48 of top horizontal frame member 28 in a similar manner. Referring back to FIG. 5, lower rear wall 82 of track members 66 additionally optionally include protrusions 90 which may receive clips (not shown) for connecting a pair of horizontally adjacent track members 66 to prevent dislodgment of track members 66 from intermediate horizontal frame member 40 (or top horizontal frame member 28).

Referring to FIG. 2, a portion of framework 22 of an exemplary partition system 20 is shown which includes two vertical frame members 26 connected by top horizontal frame member 28 and bottom horizontal frame member 30, and further, also includes two intermediate horizontal frame members 40. Three track members 66 may be attached to the framework 22 on one side of the frame in the manner described above, and three track members 66 may also be attached to the opposite side of framework 22 as desired. Specifically, on one side of framework 22, one track member 66 is attached to the top horizontal frame member 28, and two track members 66 are attached to the respective intermediate horizontal frame members 40 (FIG. 5).

A top cap (not shown) generally rests upon and attaches to a top of uppermost track members 66 of the partition system framework 22. The top cap covers channel 32 of top horizontal frame members 28, and provides an aesthetic, finished upper surface to framework 22 of partition system 20. Vertical trim elements (not shown) may be used to provide aesthetic, finished surfaces to framework 22 of partition system 20 at locations where vertical frame members 26 would otherwise be exposed.

Each frame 22 may be provided with a known electrical and/or data raceway disposed along its lower edge, i.e., beneath lower horizontal frame member 30. The raceway typically includes electrical and/or data harnesses (not shown) which are mounted beneath lower horizontal frame member 30. One example of a raceway for the panel system is disclosed in U.S. Pat. No. 4,918,886, which is assigned to the assignee of the present application and is expressly incorporated herein by reference. As shown in FIG. 1, cover plates 118 are positioned along a lower length of framework 22 and may also be secured to lower horizontal frame member 30 by any suitable fastening method including being snap fit or held in position by screws or the like. The cover plates protect the wires of the assembly from damage and provide a desired aesthetic finish to the lower edge of the panels.

Referring to FIG. 6, tiles, such as decorative tiles 24 or header tiles 25, having similar upper and lower edges, are removably mounted and/or attached to track members 66 by tilting the tile at an angle with respect to vertical and inserting the upper edge of the tile into tile space 86 defined between lower wall 74, lower front wall 80, and lower rear wall 82 and inserting the tile upwardly within tile space 86 while also moving the tile to a vertical position. This first component of movement of the tile is shown by arrow 92 in FIG. 6. In this manner, the lower edge of the tile clears upper front wall 76 of another track member 66 (or clears ridge 56 of horizontal wall 54 of a bottom horizontal frame member 30, FIG. 3B), and the lower edge of the tile is moved along arrow 93 into tile space 84 defined between upper wall 72, upper front wall 76, and upper rear wall 78 of the track member 66. Thereafter, as shown by arrow 94 in FIG. 6, the tile is shifted downwardly such that the lower edge of the tile rests on upper wall 72 of the lower track member 66 (or upon horizontal wall 54 of a bottom horizontal frame member 30).

On one side of frame 22 of FIG. 1, each intermediate horizontal frame member 40 may be selectively positioned along a plurality of aligned slots 38 in vertical frame members 26, as described above, such that a tile receiving space above top intermediate horizontal frame member 40 is larger than a tile receiving space below lower intermediate horizontal frame member 40 while both tile receiving spaces have the same width defined between vertical frame members 26. In this manner, upper tile 24 mounted between a pair of track members 66 will have a greater height than lower tile 24, which is mounted between the lowermost track member 66 and the bottom horizontal frame member 30 of the frame 22 in the manner described above. Alternatively, while both tile receiving spaces have the same width, the size of the tile receiving space above a top intermediate horizontal frame member 40 may be less than or equal to the size of the tile receiving space below lower intermediate horizontal frame member 40, such that upper tile 24 has a height that is respectively less than or equal to the height of lower tile 24.

Figure 4:
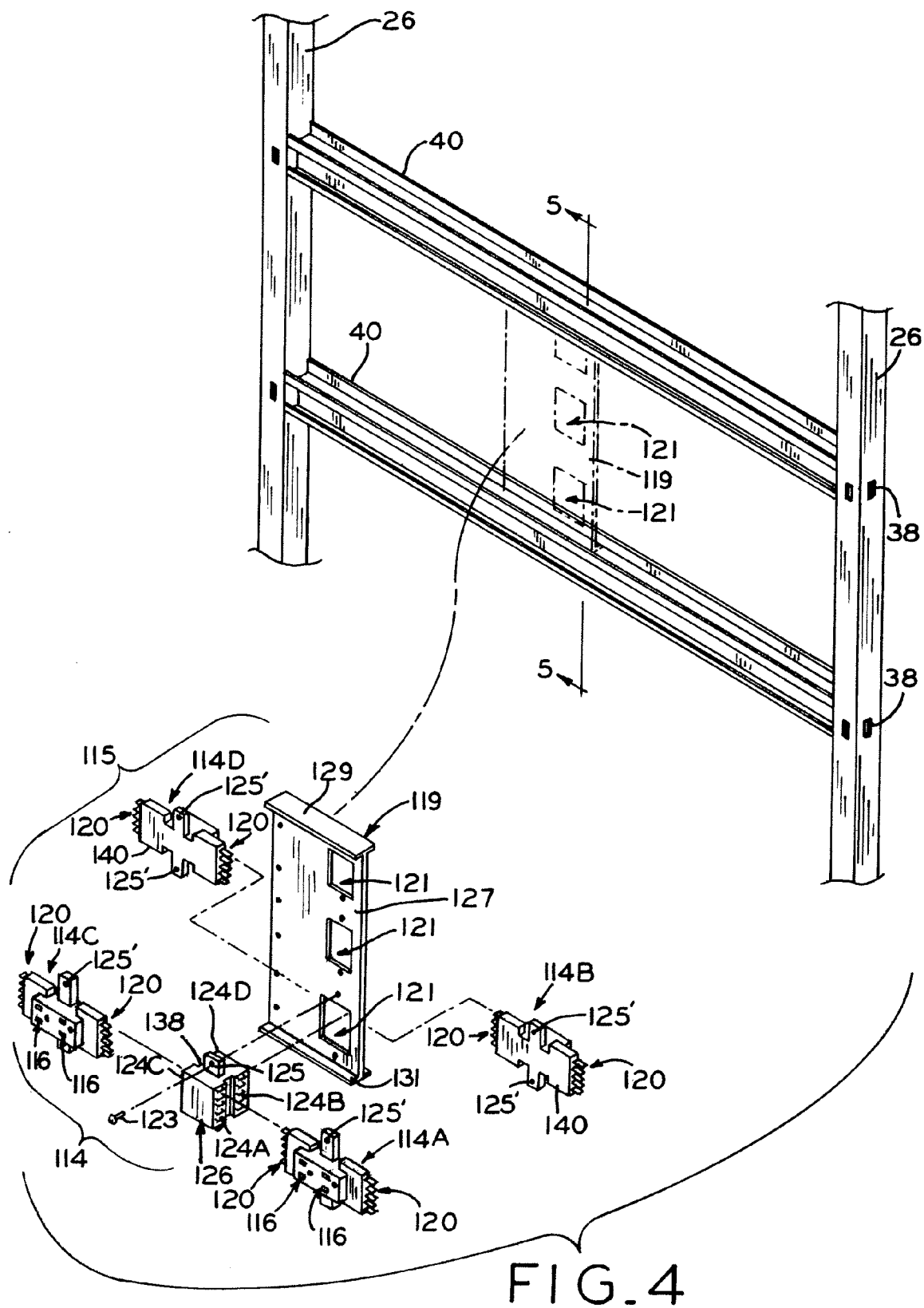
FIG. 4 is fragmentary view of the frame assembly of FIG. 2, showing a pair of intermediate horizontal frame members with a bracket secured between the intermediate horizontal frame members, as well as an exploded view of an electrical outlet module mounted to the bracket, the electrical outlet module including an electrical connector block and electrical outlet receptacles connectable to the electrical connector block on opposite sides of the bracket.
Figure 7:
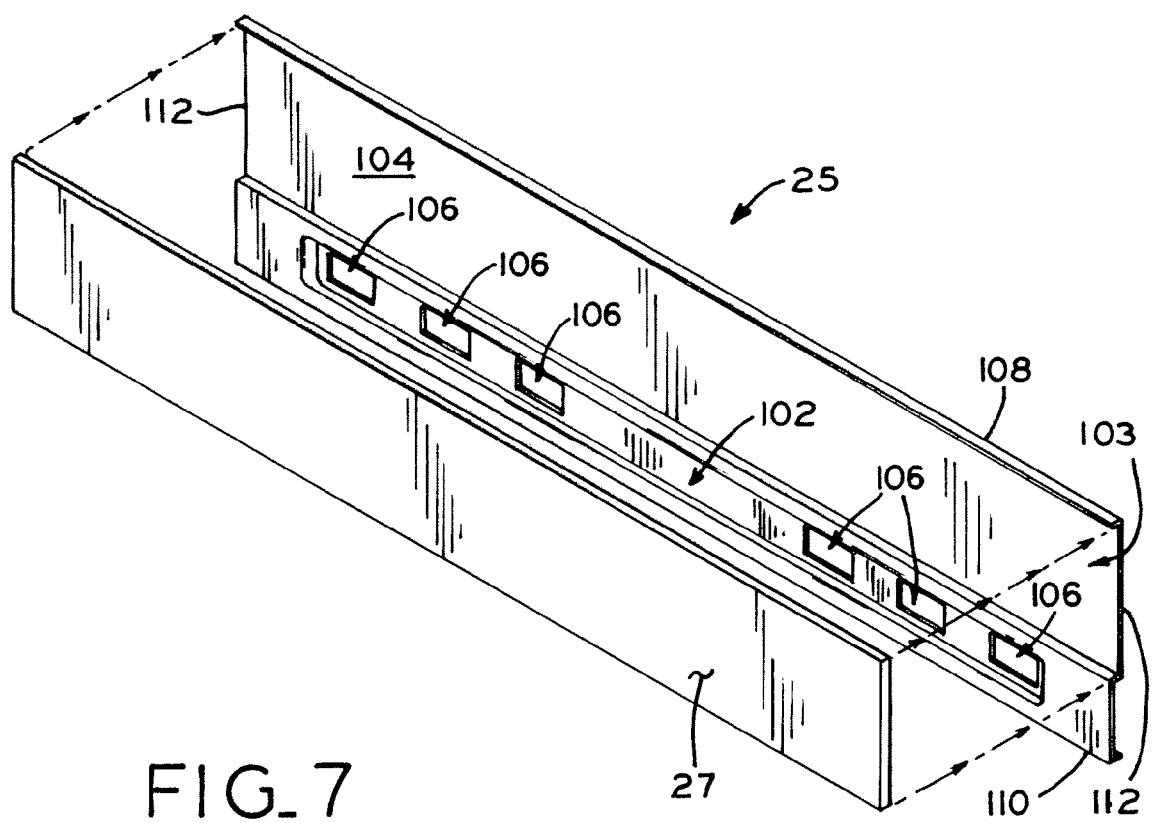
FIG. 7 is an exploded view of the header tile of FIG. 6.

Referring to FIG. 4, the attachment of electrical service assemblies 100 to frames 22 provides electrical and/or data service throughout framework 22 of partition system 50, as will be described below. In FIGS. 1, 6, and 7, tiles such as header tiles 25 are shown which, in addition to decorative tiles 24, may be mounted to framework 22 of partition system 20 to provide functional features thereto such as covering portions of electrical service assembly 100 while providing exposure of other portions of electrical service assembly 100 such as electrical outlet receptacles 116 for accessibility by a user externally of a panel or of framework 22.

Referring to FIG. 7, the electrical header tile 25 of the electrical service assembly 100 generally includes a lower cavity 102 in front face 104, which has one or more horizontally aligned outlet module openings or apertures 106 therein, as well as upper edge 108, lower edge 110, and side edges 112. Outlet module apertures 106 are positioned and dimensioned for receipt of outlet modules 114 which, as shown in FIG. 1, may include electrical outlet receptacles 116, such that apertures 106 allow access to outlet modules 114 from externally of a given panel frame. Header tile 25 further includes an upper cavity 103 in front face 104 for receipt of a filler tile, such as tile 27. Tile 27 may be either decorative or functional, and may be made of a material such as tackable fabric, metal, marker, or wood, for example.

Electronic service assembly 100 supports a wiring assembly that is partially covered by header tiles 25 on its opposite sides, and is mountable between a pair of intermediate horizontal frame members 40 at a desired, selectively positionable height within framework 22, as described below. Electrical service assembly includes a plurality of I-shaped brackets secured between the pair of intermediate horizontal frame members 40, and electrical components may be mounted to the brackets. The electrical components may be, for example, electrical outlet modules and electrical connector blocks connecting the electrical outlet modules to one another. Further, the electrical outlet modules may include electrical outlet receptacles associated with different circuits in different electrical configurations, as described further below with reference to FIG. 8. Moreover, as described below, first and second electrical outlet modules connected via an electrical connector block may be electrically connected to separate electrical circuits and include different electrical configurations.

Referring to FIG. 1, electrical service assembly 100 is disposed between a pair of intermediate horizontal frame members, typically at a level substantially adjacent or above a work surface. However, as will be apparent from the description herein, intermediate frame members 40 and electrical service assembly 100 may be horizontally mounted at any desired vertical height along vertical frame members 26 and with respect to the framework of a panel with which they are associated. Apertures 106 are provided in header tile 25 to allow receptacles 116 of electrical outlet modules 114 to be exposed and accessible by a user externally of framework 22 (FIG. 1).

Figure 10:
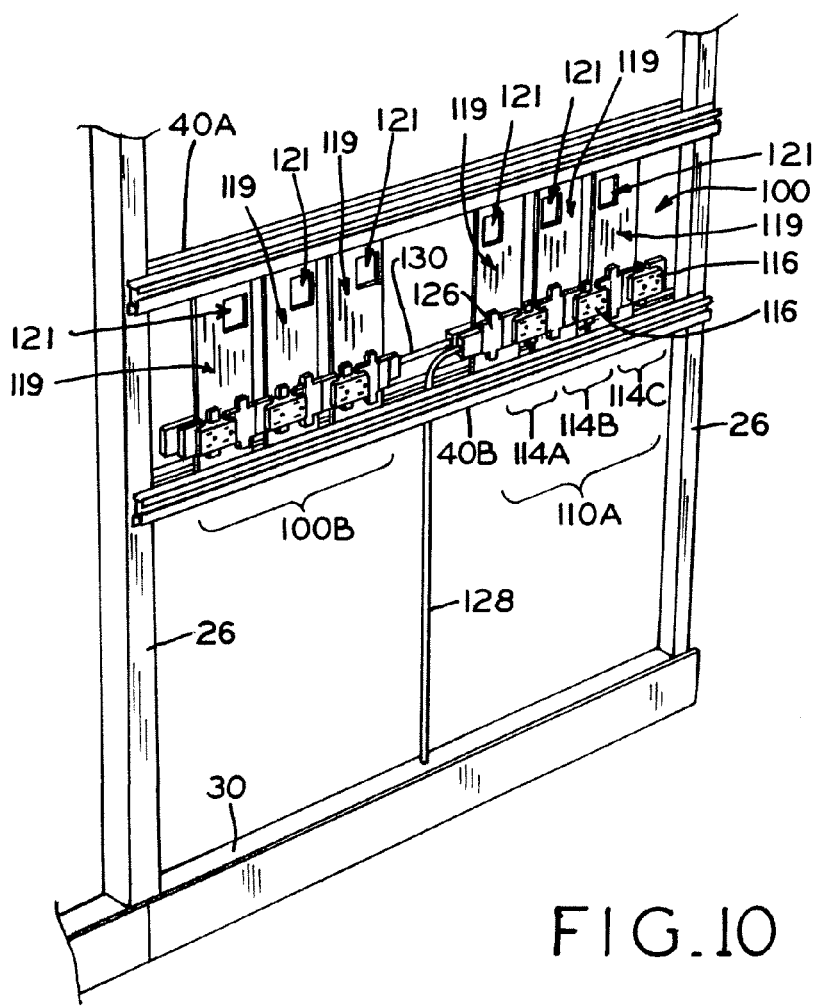
FIG. 10 is a perspective view of the electrical service assembly of FIG. 1, without the header tile of FIG. 6.

Referring to FIG. 10, electrical service assembly 100 includes a plurality of separate electrical outlet modules 114 which are spaced along a length of framework 22 and secured to brackets 119, wherein brackets 119 are in turn secured between intermediate horizontal frame members 40, to provide electricity to the partitioned office space. In this manner, the electrical components of the system are secured with respect to the framework of the system. Referring to FIG. 4, an exemplary section 115 of electrical service assembly 100 includes one bracket 119, up to four electrical outlet modules 114 each including a pair of electrical outlet receptacles 116 (FIG. 8) and sockets 120 on either side of electrical outlet receptacles 116, and an electrical connector block 126 having up to four sockets 124 to mate with respective sockets 120 on of the electrical outlet modules 114, as further described below.

Bracket 119 is an I-shaped bracket having vertical web 127 including first and second opposite sides, vertical web 127 disposed between top horizontal web 129 and bottom horizontal web 131. Bracket 119 further includes openings 121 in which electrical connector blocks 126 may be positioned such that connector blocks 126 extend through openings 121 in brackets 119. Fasteners, such as screws 123, are received through an aperture within mounting flange 125 extending from block 126 and into an aperture in bracket 119 to fasten block 126 to bracket 119 with block received within opening 121 of bracket 119.

Continuing to refer to the exemplary section 115 of the electrical system shown in FIG. 4, a pair of electrical outlet modules 114 may be attached or connected to bracket 119 in a configuration that is either a first configuration, in which the pair of electrical outlet modules 114 are connected to a common side of bracket 119 and are accessible from a common side of a given panel frame, such as panel 21B, or a second configuration, in which the pair of electrical outlet modules 114 are connected to opposite sides of bracket 119 and are accessible from a opposite sides of panel 21B. Moreover, one pair of electrical outlet modules 114 may be attached to connector block 126 on a first common side of bracket 119 in a first configuration accessible from the first side of panel 21B, and/or another pair of electrical outlet modules 114 may be attached to connector block 126 on a second side of bracket 119 in a second configuration accessible from the second, opposite side of panel 21B. Each electrical outlet module 114 may also be attached via a fastener, such as screw 123, received through an aperture within mounting flange 125' extending from a respective electrical outlet module 114 and into an aperture in bracket 119 to fasten electrical outlet module 114 to bracket 119. To mount the components, electrical connector block 126 may first be disposed through opening 121 of bracket 119 and then fastened to bracket 119, and then each electrical outlet module 114 may be connected to electrical connector block 126, as described further below, and fastened to bracket 119 as described above. Alternatively, a first pair of electrical outlet modules 114 may be fastened to one side of connector block 126, followed by inserting connector block 126 through opening 121 of bracket 119 and then fastening the components to bracket 119, followed by connecting a second pair of electrical outlet modules 114 to the opposite side of electrical connector block 126.

Connector blocks 126 and electrical outlet modules 114 may be mounted to brackets 119 before brackets 119 are secured between intermediate horizontal frame members 40, in a manner described below. Alternatively, brackets 119 may first be secured between intermediate horizontal frame members 40 before connector blocks 126 and modules 114 are mounted to brackets 119 in the manner described above.

Referring to FIG. 5, after upper and lower intermediate horizontal frame members 40A and 40B, respectively, are selectively positioned along slots 38 of vertical frame members 26, bracket 119 may be secured between upper and lower intermediate horizontal frame members 40A and 40B. Bracket 119 may be tilted at an angle with respect to vertical for inserting bottom horizontal web 131 of bracket 119 into upper channel 67 of lower intermediate frame member 40B. Upper channel 67 (FIG. 3C) is defined by upper horizontal wall 62 and between vertical track member mounting walls 58 of intermediate horizontal frame member 40. Bracket 119 may then be moved to a vertical position such that top horizontal web 129 of bracket 119 is received against and abuts a bottom surface of lower horizontal wall 64 of an upper intermediate horizontal frame member 40A. In the vertical, seated position, top horizontal web 129 of bracket 119 may be fastened, via screws 123, for example, to the bottom surface of lower horizontal wall 64 of upper intermediate horizontal frame member 40A. A pair of track members 66 may then be mounted to the lower horizontal intermediate frame member 44 as shown in FIG. 5, with the track members 66 retaining the lower horizontal web 131 of bracket 119 within upper channel 67 of the lower intermediate horizontal frame member 44.

Referring to FIG. 4, electrical outlet modules 114 have sockets 120 disposed at each end for electrically connecting to terminals within sockets 124 of electrical connector blocks 126. Sockets 120 of electrical outlet receptacles 116 are male in construction and are received by female sockets 124 of electrical connector blocks 126, though the reverse mating arrangement is possible. Terminals within sockets 124 of electrical connector blocks 126 may connect to multi-circuit cables, such as electrical in-feed cable 128 and jumper cable 130 (FIGS. 1, 9, and 10).

Figure 9:
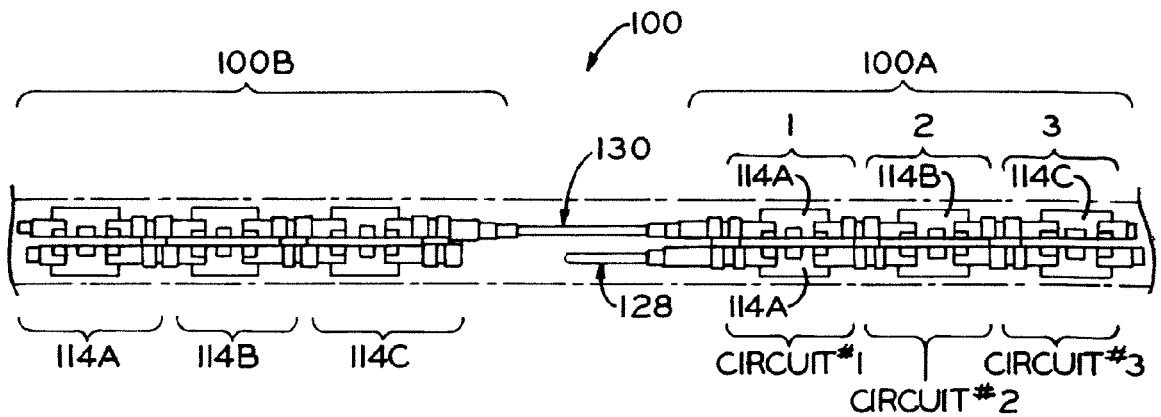
FIG. 9 is a top plan view of the electrical components of the electrical service assembly of the present invention, taken along line 9-9 of FIG. 1.

Referring to FIGS. 9 and 10, a plurality of exemplary sections 115 (FIG. 4) may be selectively installed as described above, in order to vary the location and number of electrical components in electrical service assembly 100. As shown in FIG. 9, three such sections form a subsection 100A on one side of the panel and another three such section form another subsection 100B on the other side of the panel. Subsections 100A and 100B of electrical service assembly 100 may be connected to one another via jumper cable 130, allowing for a series of interconnected modules 114. The series of modules 114 may be electrically connected by connecting socket 120 of one module 114 with socket 124 of a first electrical connector block 126 on one end and an opposite end socket 120 of the module with socket 124 of a second electrical connector block 126. Blocks 126 may connect to one another via jumper cable 130 or connect to electrical in-feed cable 128 to receive power from a power supply. Further, as described below, subsection 100A may include a selective wiring in each of modules 114A, 114B, and 114C, such that each of the modules may respectively be used on different circuits such as circuit #1, circuit #2, and circuit #3, as shown in FIG. 9.

Referring back to FIG. 4, electrical connector block 126 includes ends that each have a pair of sockets 124A, 124B, and 124C, 124D protruding therefrom, respectively, and each electrically connected. Sockets 124A and 124B are flush with central edges 138 of electrical connector block 126 and are female in construction so as to electrically connect with male sockets 120 of modules 114. Similarly, sockets 124C and 124D may be female in construction to electrically connect with male sockets 120 of modules 114. Alternatively, sockets 124C and 124D may be male for receipt into female sockets of cables 128 and 130, or sockets 124C and 124D may be female for receipt into male sockets of cables 128 and 130. The sockets of cables 128, 130 and electrical connector blocks 126 include individual connector terminals (not shown) that electrically contact terminals 120 to provide electrical continuity for individual circuit, as described further below.

Each module 114 includes a pair of electrical outlet receptacles 116 to which electrical appliances may be connected, and as will be described hereinbelow. Referring more specifically to module 114 shown in FIG. 8, housing 140 includes a front plate 142, including receptacles 116, and rear plate 144. Front plate 142 and rear plate 144 are detachably joined by a plurality of integral pegs (not shown) and apertures (not shown). The pegs extend perpendicularly from the inner surface of front plate 142, aligning with and engaging and being welded or bonded to apertures located in inner surface 146 of rear plate 144, thereby interlocking front plate 142 and rear plate 144. Housing 140 is constructed from a non-metallic material such as plastic including flame retardant polycarbonate, polystyrene, PVC, or ABS, by any suitable method including injection molding. Front plate 142 is provided with openings that define a pair of electrical outlet receptacles 116, making module 114 a duplex module. Each receptacle 116 includes elongated apertures or slots 148 which allow prongs of a conventional electrical plug of any electrically operated device (not shown) to connect to a neutral wire and a hot wire carried within housing 140. Further provided is a smaller, D-shaped aperture 150 disposed adjacent elongated slots 148 to enable an electrical connection between a ground prong of an electric plug and a ground wire in housing 140.

Figure 8:
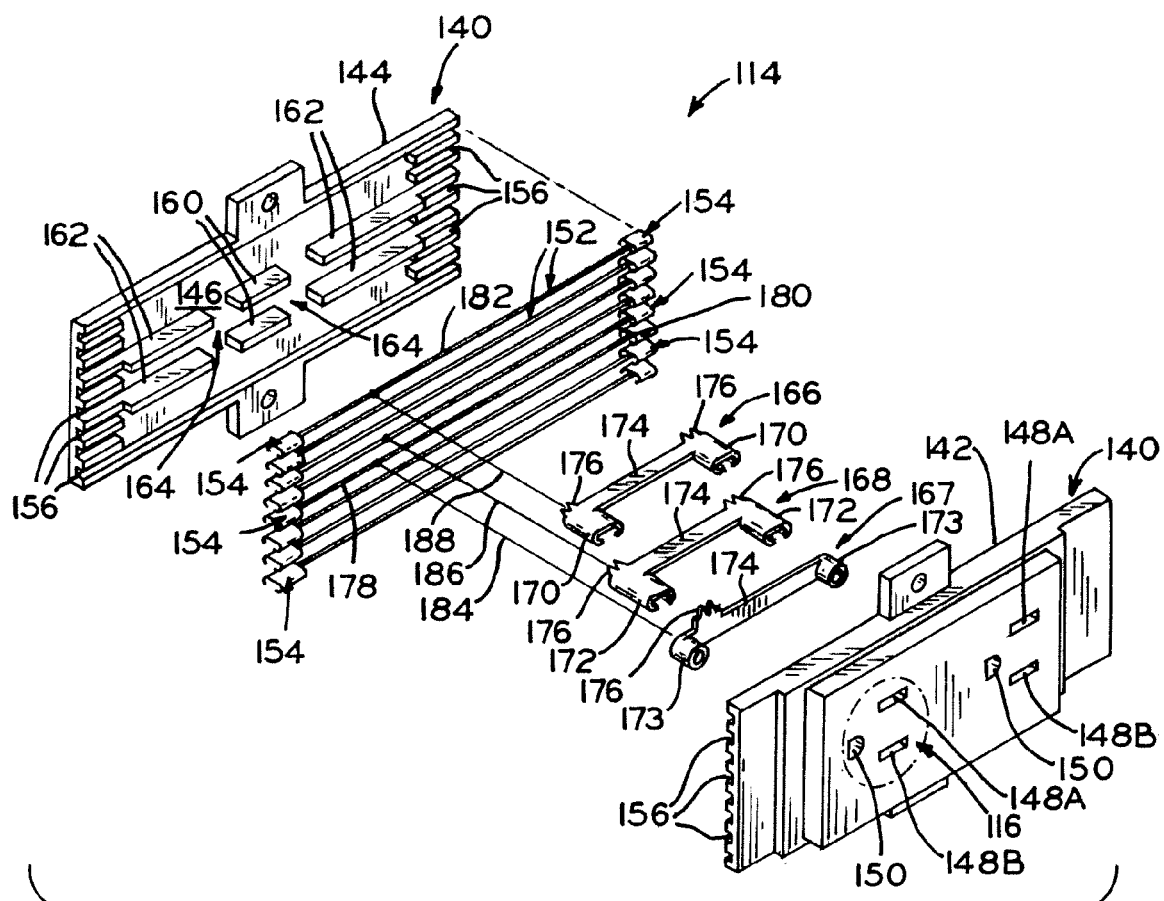
FIG. 8 is an exploded perspective view of one of the electrical outlet modules of FIG. 4, showing the electrical connections of the electrical outlet receptacles of the electrical outlet module in the wiring system of the present invention.

Each module 114 carries a plurality of active conductors or wires 152 which extend the length of receptacle housing 140 as discussed above. In a preferred embodiment, wires 152 have metal terminals 154 secured to respective ends of the modules 114 as shown in FIG. 8. Wires 152 have an insulative jacket disposed thereon so as to protect against shorts in module 114.

Front plate 142 and rear plate 144 have ends with grooves 156 located in plates 142 and 144, respectively. When front plate 142 is assembled with rear plate 144, the ends of each plate align such that grooves 156 define openings in each end of housing 140. The openings are sized to received terminals 154 on wires 152, holding wires 152 in position within housing 140. Once in place, terminals 154 are spaced from one another to define contacts in male sockets 120 (FIG. 4) at each end of module 114.

Projecting substantially perpendicularly from inner surface 146 of rear plate 144 are partitions 160 and 162 which are longitudinally spaced from one another. Partitions 160 are shorter than partitions 162 and are centrally disposed between ends of rear plate 144. A pair of partitions 162 are placed at each end of partition 160, partitions 160 and 162 being aligned along their longitudinal axes such that voids 164 exist between adjacent partitions 160 and 162. Voids 164 are of sufficient size for receiving metal electrical connectors or spades 166 and 168 so that connectors 166 and 168 fit tightly within voids 164. Each electrical connector 166 and 168 includes a pair of female sockets 170 and 172, respectively, which align with slots 148A and 148B for receiving the male prongs of an electrical plug. Electrical connector 166, 168 is disposed between the longitudinal sets of spacers and female sockets 173 of connector 167 align with D-shaped apertures 150 for receiving the male ground prongs of an electrical plug. It is understood that any orientation of alternative partitions may be used to receive connectors 166, 167, and 168 whereby the connectors are suitably supported.

Connectors 166 and 168 are constructed from a conductive metal which, when connected with wires 152 and being in contact with the prongs of the electrical plug, provide a pathway for electrical current traveling through the wiring system to the electrically operated device. Sockets 170 and 172 are shaped such that the prongs of an electrical plug fit tightly in the sockets allowing for direct contact of the prongs and metal connectors 166 and 168. Sockets 170 of electrical connector 166, and sockets 172 of electrical connector 168 are integrally joined by bar 174. Alternatively, sockets 170 and 172 may be separate from one another and not joined by bar 174. Along the lower edge of each socket is a pair of barbs 176. When electrical connectors 166 and 168 are electrically joined to one wire 152, barbs 176 and bar 174 are folded around wire 152. In order for an electrical connection to be made, pressure is applied to barbs 176 causing barbs 176 to pierce the insulative covering about wires 152 to, contacting the bare copper wire, thereby providing a conductive pathway for electrical current.

As discussed below, the receptacles of a given module 114 may be wired to a specific circuit to allow for multiple configurations of circuits in the electrical system in a manner similar to that described in detail in U.S. Pat. No. 6,575,777, assigned to the assignee of the present application, the disclosure of which is expressly incorporated herein by reference. When manufactured, each module 114 and/or receptacle 116 may be wired to be on a specific, unique circuit. By having modules 114 wired on different circuits, for example, the electrical service assembly 100 may be provided with a desired number of modules 114 configured with different circuits to prevent overloading of a single circuit by drawing too much current on the single circuit. Thus, in one embodiment, individual work spaces defined by the panels may be provided with modules 114 all wired on the same circuit, such that different work spaces have separate circuits. In another embodiment, each work space could be provided with multiple modules 114 that are on different circuits.

For example, a first electrical module 114 includes housing 140 with wires 152 extending through housing 140 and at least a first electrical outlet receptacle 116 electrically connected with a first configuration of wires 152 for association with a first circuit, and a second electrical module 114 includes housing 140 with wires 152 extending through housing 140 and at least a second electrical outlet receptacle 114 electrically connected with a second, different configuration of wires 152 for association with a second circuit different from the first circuit. In particular, when manufacturing modules 114, eight wires 152 are carried by the receptacles with only three selected wires 152 defining a subset of conductors that are electrically connected to connectors 166, 167, and 168 to electrify electrical outlet receptacles 116. The remaining wires 152 simply pass through modules 114 without being electrically connected to connectors 166, 167, and 168. Thus, in a given outlet module 114, electrical current is supplied to all eight wires with only three being used to supply electricity to its electrical outlet receptacles 116. With reference to FIG. 8, module 114 is shown with connectors that connect to separate ground, neutral, and hot wires as indicated by lines 184, 186, and 188, respectively. For example, ground connector 167 is electrically connected with ground wire 178 as indicated by line 184. Sockets of cables 128, 130 receive male socket 120 of modules 114 and carry current from one module 114A to a second module 114B.

Referring to FIGS. 4 and 8, module 114 is electrically connected to a ground wire, a neutral wire, and a hot wire, such that the pair of electrical outlet receptacles 116A and 116B of the module 114 are on the same circuit. Alternatively, the pair of electrical outlet receptacles 116A and 116B of the module 114 may connect to the ground, neutral, and hot wires in different configurations, such that receptacles 116A and 116B within the same module are connected to different circuits. For example connectors 166 and 168 may not include bars 174 and 176, respectively, such that the sockets 170 of connector 166 are separate from one another and may be connected to different wires 154, and sockets 172 of connector 166 are separate from one another and may be connected to different wires 154.

Modules 114 may also connect to ground, neutral, and hot wires in different configurations, to be electronically connected to different circuits. For example, as shown in FIG. 4, duplex module 114B is mounted directly behind module 114A in a back-to-back manner. The receptacles of module 114B may be electrically connected to the same ground 178 and the same neutral wire 180 as the receptacles of module 114A. However, in order to place the receptacles of module 114B on a separate circuit than module 114A, the receptacles of module 114B could be electrically connected to a different, second hot wire 182. Another pair of modules 114C and 114D, for example, may also be connected to separate circuits by having the receptacles of modules 114C and 114D each electrically connected to a different ground wire, neutral wire, and hot wire to provide completely independent circuits in which the ground and neutral wires are not shared by adjacent modules. With selected modules 114 wired to have a separate circuits, framework 22 may be easily provided with a plurality of circuits to prevent overloading of a single circuit.

Thus, to provide electrical connections to separate circuits, for example, a first electrical appliance, such as a computer, may be connected to a first electrical outlet receptacle 116A of a first electrical outlet module 114A and a second electrical appliance, such as a printer, may be connected to a second electrical outlet receptacle 116B of the first electrical outlet module 114A or a second electrical outlet module 114B that includes a different connective configuration with respect to the eight wires described above than the first electrical outlet receptacle 116A to place the first and second electrical outlet receptacles on different and separate circuits and to prevent overload of electrical service assembly 100 when multiple electrical appliances are powered by electrical service assembly 100. Other electrical appliances may include, for example, cell phones, telephones, dictation devices, and light source devices such as lamps.

Referring to FIGS. 9 and 10, one electrical service assembly 100 is supplied with power from a floor entry supply (not shown) from a bottom raceway, as described above, via electrical in-feed cable 128 which supplies electricity to receptacles 116 via electrical in-feed cable 128 and electrical connector block 126. The source of power may be AC power from an outlet in a wall (not shown) or an existing electrical power component in the electrical raceway. The electrical service assembly 100 may also be supplied with power from a ceiling entry supply. Electricity may also be supplied via an upper raceway positioned on top of top horizontal frame member 28, or via an electrical in-feed column (not shown) connected through a vertical frame member 26 to electrical service assembly 100 and supplying electricity from a direct connection to a power supply within a floor or a ceiling.

Advantageously, by positioning electrical service assembly 100 above a work surface height, wherein a work surface (not shown) is disposed below electrical outlet receptacles 116 of FIG. 10, a user is permitted ease of access to the separate electrical outlet receptacles 116. Further, a given panel may include more than one electrical service assembly 100. For example, a panel may include a pair of electrical service assemblies 100, one having electrical outlet receptacles 116 positioned above a work surface (not shown) and the other having electrical outlet receptacles 116 positioned below the work surface. By having electrical outlet receptacles 116 that may include different wiring configurations as discussed above, the likelihood of system overload is reduced, permitting for an increased usage of electrical appliances. Further advantageously, by positioning electrical receptacles 116 of electrical service assembly 100 on different sides of a given panel, shown as front and back surfaces 134 and 136, respectively, in FIG. 1, users in different, separate work spaces (not shown) may utilize the same electrical service assembly 100 while also connecting appliances to different circuits.

In another embodiment, illustrated in FIGS. 11-16, electrical service assembly 100' is shown which, except as described below, is similar to electrical service assembly 100 and may include identical electrical components. Electrical service assembly 100' does not include the intermediate horizontal frame members 44 of electrical service assembly 100, but rather is directly attachable to the vertical frame members of a given panel at a selected vertical position. Assembly 100' also includes a single, elongated bracket extending between the pair of vertical frame members to which the electrical components, including connector blocks 126 and electrical outlet modules 114, are secured.

Figure 11:
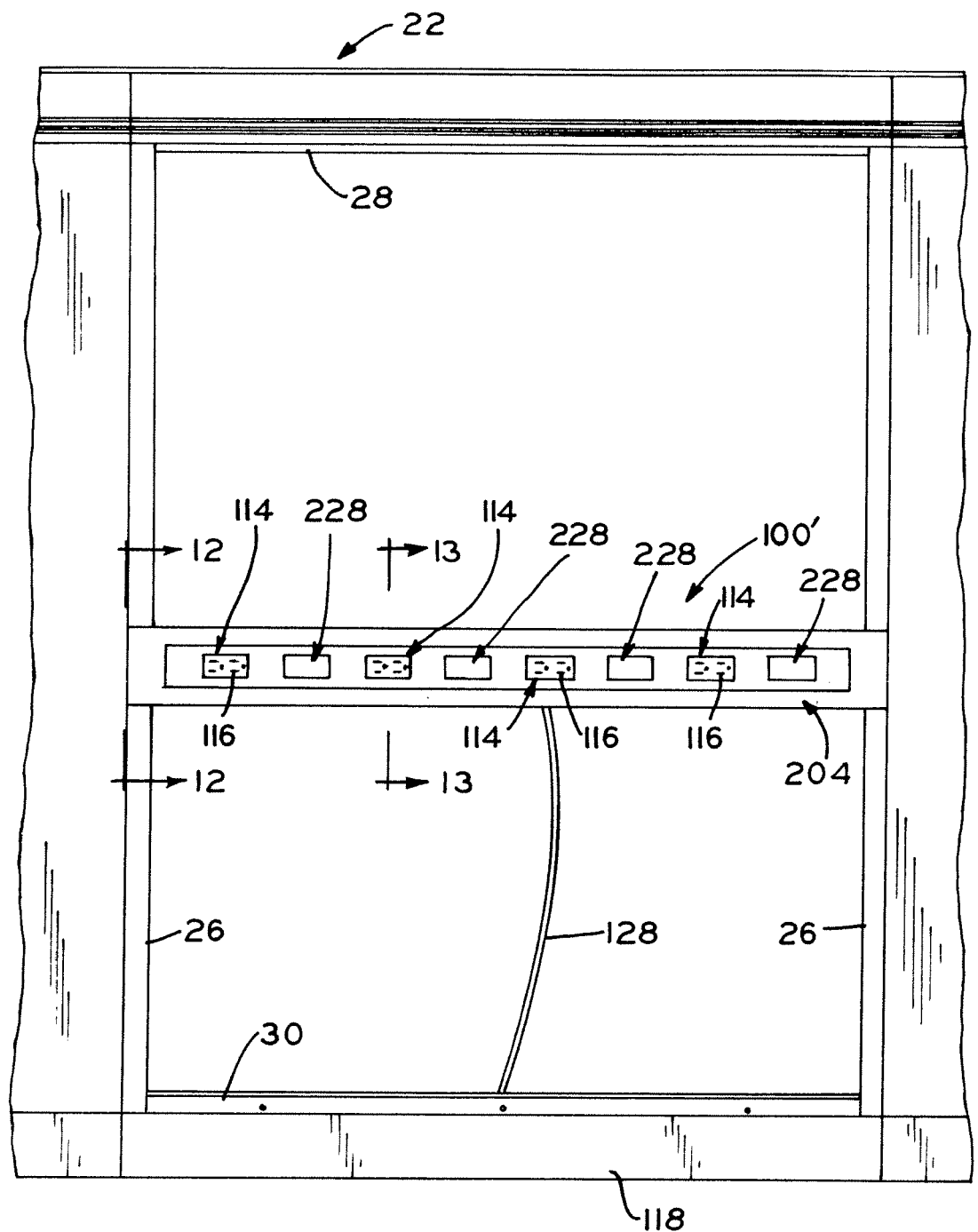
FIG. 11 is an elevational view of another exemplary partition system having a frame assembly and an electrical service assembly according to another embodiment of the present invention.

Referring to FIG. 11, electrical service assembly 100' includes an elongate horizontal bracket 190 (FIG. 15) to which electrical outlet modules 114 are secured. Bracket 190 includes openings 192 similar to openings 121 in brackets 119, described above, and electrical connector blocks 126 are mounted in a similar manner through openings 192. Bracket 190 includes web ends 194 and 196 which may be selectively secured to vertical frame members 26 with screws, for example. A pair of snap connectors 198 each are fastened via screws, for example, to opposite side surfaces of vertical frame members 26. The pair of snap connectors 198 are positioned for receipt of identical, oppositely positioned first and second header tiles 202, as described below. Further, each pair of snap connectors 198 are disposed externally adjacent each web end 194 and 196.

Snap connectors 198 include a vertical member 206 and two horizontal members 208 and 210 extending from ends of vertical member 206 and including grooves 212 and 214, respectively. Each header tile 202 includes an upper end 202A and a lower end 202B. Upper end 202A includes an extending horizontal flange 216 that extends between side ends 220 of header tile 202 and that extends from upper wall 232 of header tile 202. Lower end 202B includes an extending horizontal flange 218 that extends between side ends 220 of header tile 202 and that extends from lower wall 234 of header tile 202. Horizontal flanges 216 and 218 include protrusions 224 and 226, respectively, for respective receipt into grooves 212 and 214, respectively, to connect header tile 202 to either side of bracket 190 via snap connectors 198, as shown in FIGS. 12 and 13.

Figure 13:
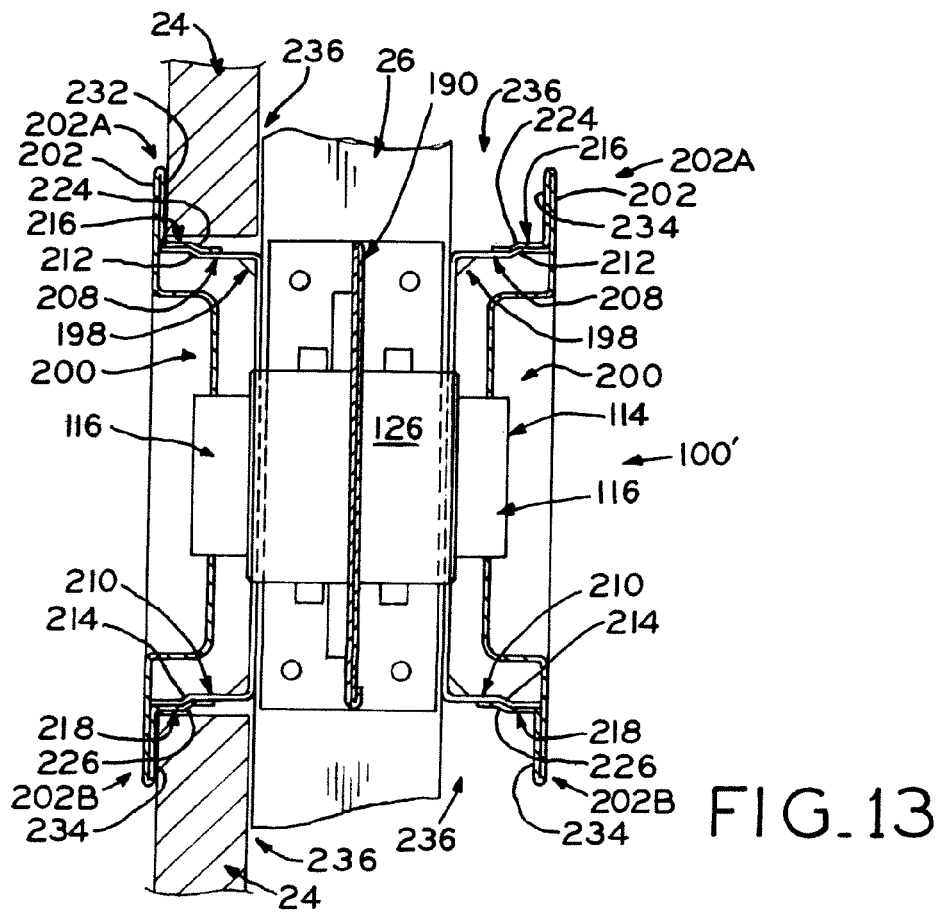
FIG. 13 is a cross-sectional view taken along line 13-13 of FIG. 11, showing electrical outlet modules mounted on opposite sides of an elongate horizontal bracket, and further showing cover tiles captured in tile receiving spaces of the electrical service assembly of FIG. 11.
Figure 14:
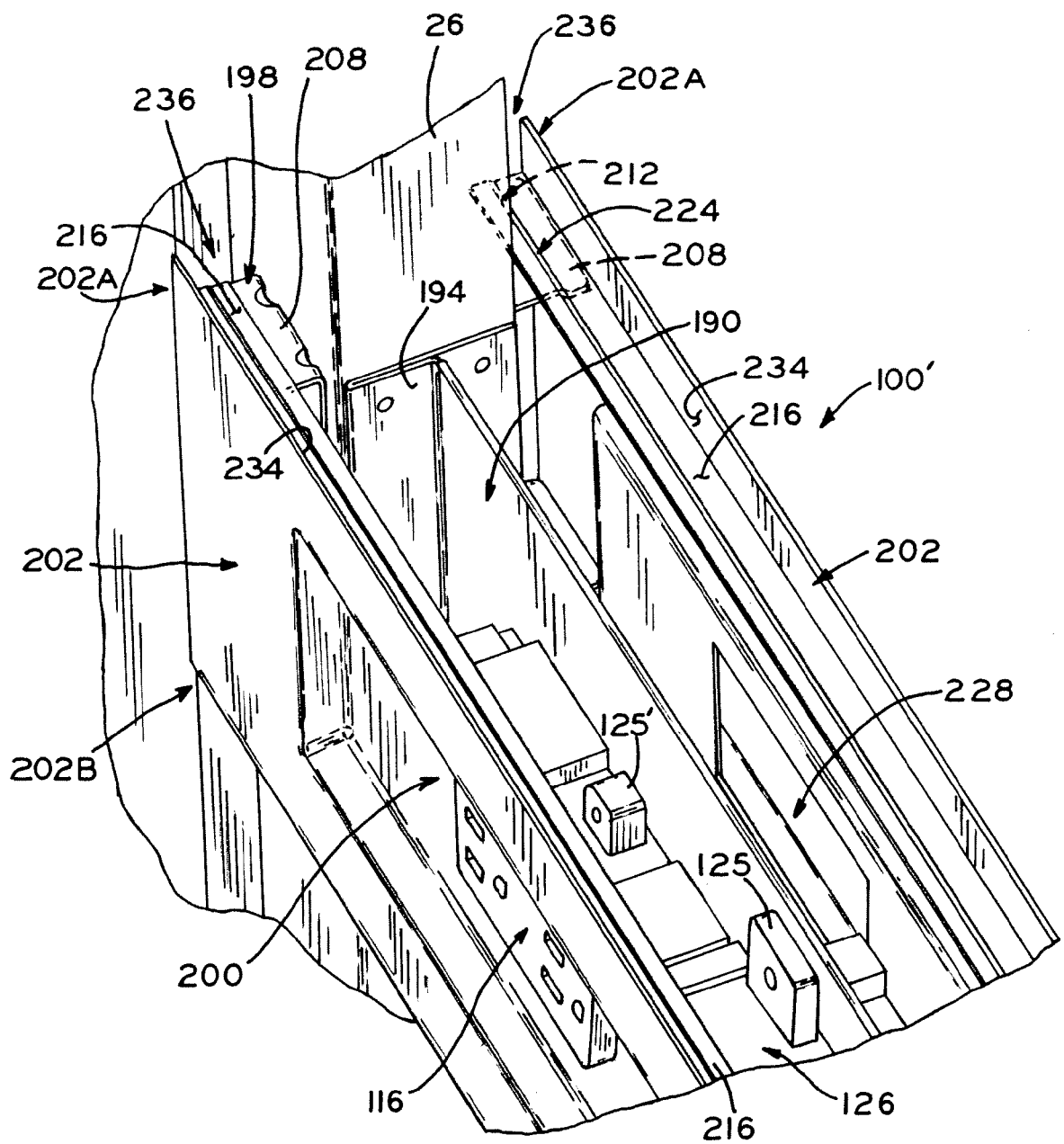
FIG. 14 is a top perspective, fragmentary view of a portion of the electrical service assembly of FIG. 11.
Figure 15:
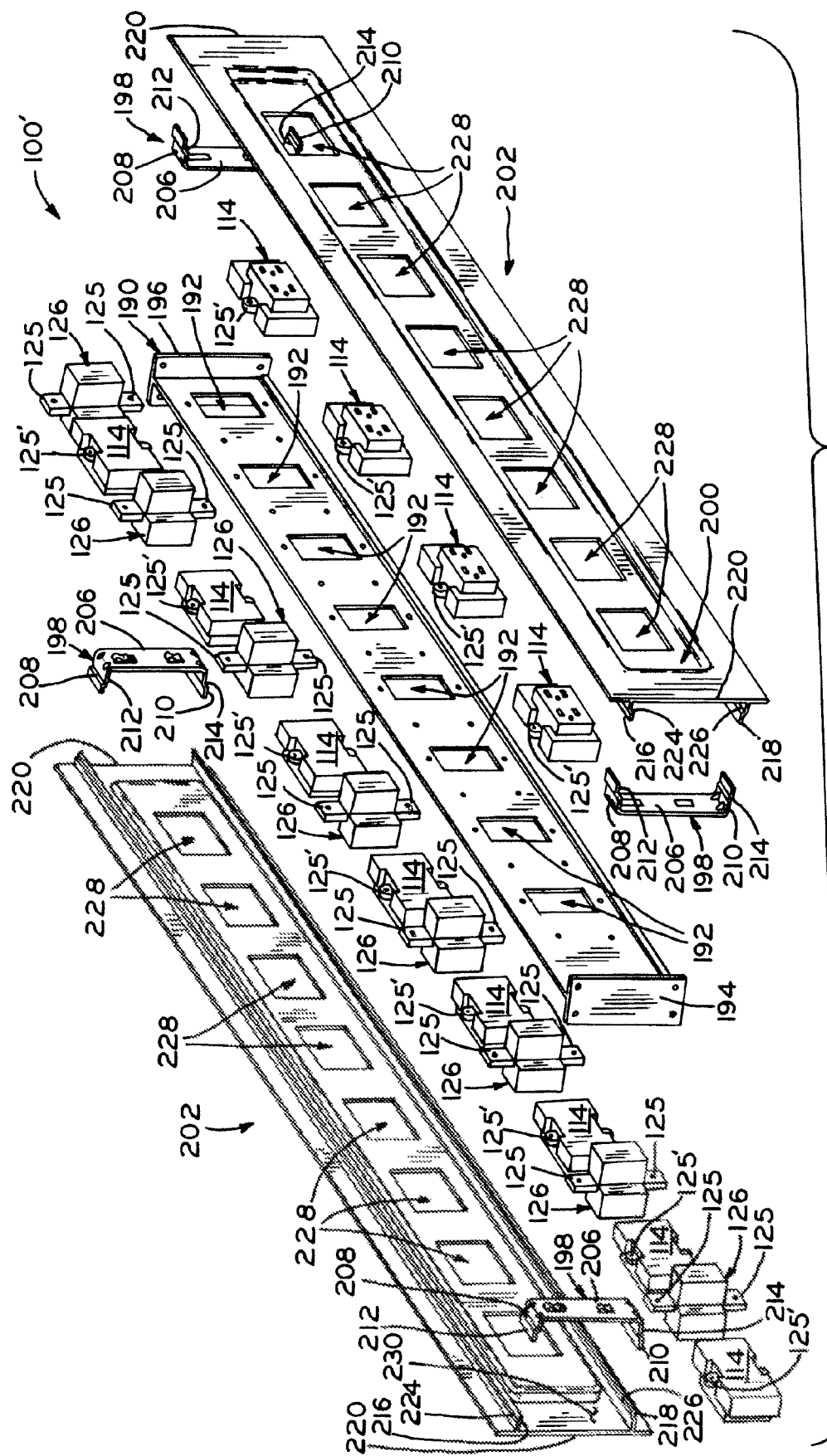
FIG. 15 is an exploded view of the electrical service assembly of FIG. 11.

Further, as shown in FIGS. 13 and 14, upper end 202A and lower end 202B of header tile 202 define tile-receiving spaces 236 with a given panel frame, such as panel 21B into which first and second cover tiles 24 can be received. In particular, tile-receiving spaces 236 that receive lower edges of cover tiles 24 are defined between upper wall 232 and extending horizontal member 216 of a header tile 202 and a respective front or back surface of vertical frame member 26. Further, tile-receiving spaces 236 that receive upper edges of cover tiles 24 are defined between lower wall 234 and extending horizontal member 218 of a header tile 202 and a respective front or back surface of vertical frame member 26. As described above, the ends of tiles 24 opposite the ends received into tile-receiving spaces 236 are received into other tile-receiving spaces of a given panel frame such as tile space 86 of track member 66 mounted to top horizontal frame member 28 and/or into a space defined by side walls 52, horizontal walls 54, and ridges 56 of bottom horizontal frame member 30.

Figure 12:
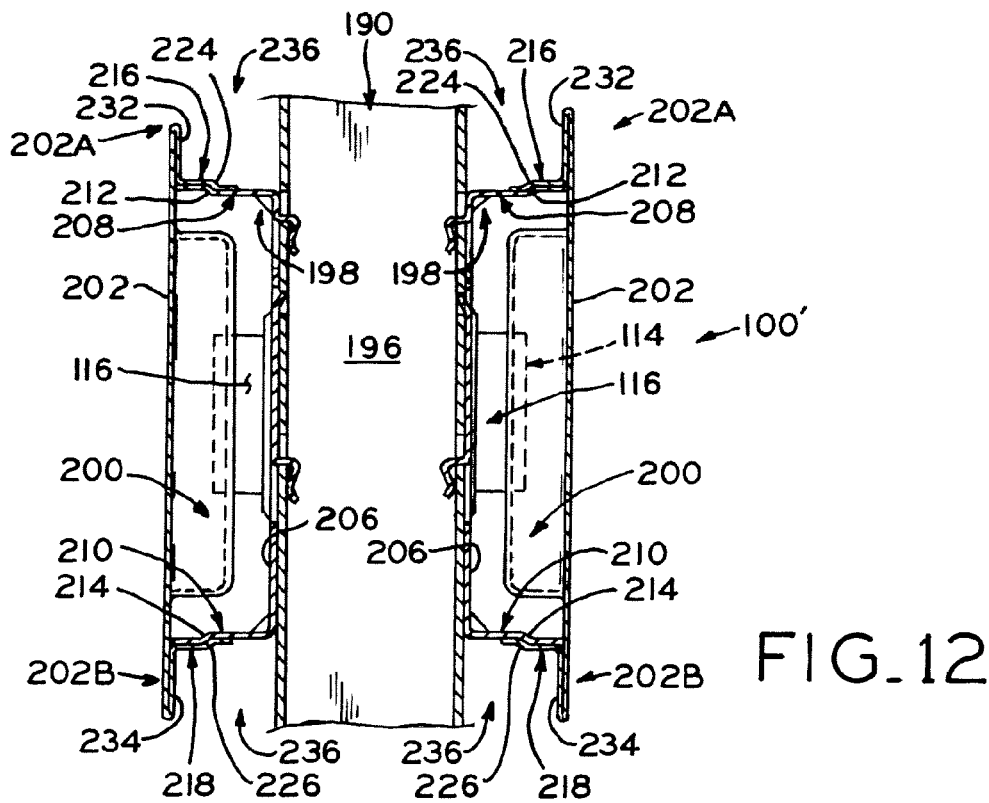
FIG. 12 is a cross-sectional view taken along line 12-12 of FIG. 11, showing the electrical service assembly covered on either side of the partition system by a header tile, and having an elongate horizontal bracket to which a plurality of electrical outlet modules are mounted.
Figure 16:
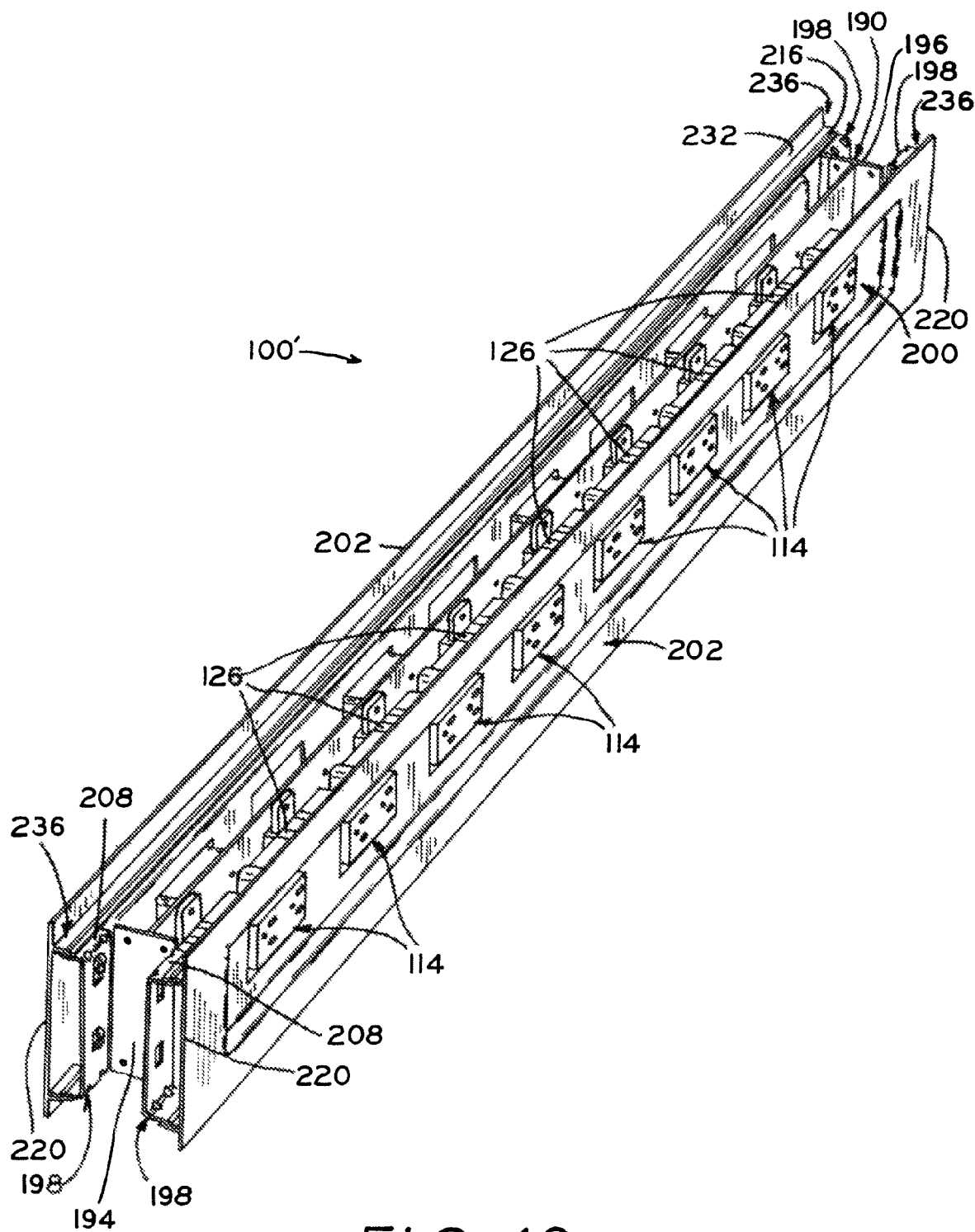
FIG. 16 is perspective view of the electrical service assembly of FIG. 11.

Referring to FIGS. 12 and 13, each header tile 202, 204 also includes in cross-section cavity 200 including apertures 228 (FIGS. 11 and 15) for receipt of portions of electrical outlet receptacles 116 upon assembly, as shown in FIG. 16. Side ends 220 of each of header tiles 202 include internal side surfaces 230 inwardly extending from side ends 220, which extend past web ends 194, 196 of bracket 190 for connection to snap connectors 198. As shown in FIG. 14, snap connectors 198 abut front and back side surfaces of vertical frame members 26, which define portions of tile-receiving spaces 236, as described above.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An office partition system, comprising:
a substantially rectangular panel frame including a pair of vertical frame members, a top horizontal frame member disposed between upper ends of said pair of vertical frame members, and a bottom horizontal frame member disposed between lower ends of said pair of vertical frame members, said vertical frame members each including a front face;
at least an upper cover tile removably mounted to said panel frame, said upper cover tile including a lower edge, and
an electrical service assembly comprising:
an elongate horizontal bracket extending between and secured at opposite ends thereof to said pair of vertical frame members, at least one snap connector fastened to said front face of each vertical frame member of said pair of vertical frame members, each said snap connector comprising a horizontal flange,
a plurality of electrical outlet modules mounted to said elongate horizontal bracket,
a header tile having an upper vertical wall and an upper horizontal flange horizontally extending from said upper vertical wall, said header tile mounted over said elongate horizontal bracket via engagement between said horizontal flanges of said snap connectors and said upper horizontal flange of said header tile such that said header tile overlaps at least a portion of said front faces of said pair of vertical frame members, said header tile including apertures respectively aligned with said plurality of electrical outlet modules whereby said electrical outlet modules are accessible from externally of said panel frame; and said front faces of said vertical frame members, said horizontal flange of said header tile, and said upper vertical wall of said header tile together defining an upper vertical tile-receiving space therebetween, said lower edge of said upper cover tile received within said upper tile-receiving space with said upper vertical wall overlapping at least a portion of said upper cover tile.

2. The office partition system of claim 1, wherein a pair of said electrical outlet modules are connected to said bracket in a configuration selected from the group consisting of:
 a first configuration in which said pair of electrical outlet modules are connected to a common side of said bracket with said pair of electrical outlet modules accessible from a common side of said panel frame; and
 a second configuration in which said pair of electrical outlet modules are connected to opposite sides of said bracket with said pair of electrical outlet modules accessible from opposite sides of said panel frame.

3. The office partition system of claim 1, wherein said plurality of electrical outlet modules comprise:
 a first electrical outlet module comprising a housing, a plurality of electrical conductors extending through said housing, and at least one first electrical outlet receptacle electrically connected with a first configuration of said conductors whereby said at least one first electrical outlet receptacle is associated with a first circuit; and
 a second electrical outlet module comprising a housing, a plurality of electrical conductors extending through said housing, and at least one second electrical outlet receptacle electrically connected with a second configuration of said conductors different from said first configuration whereby said at least one second electrical outlet receptacle is associated with a second circuit.

4. The office partition system of claim 3, wherein at least one of said first and second electrical outlet receptacles is connected to a subset of said conductors fewer in number than said plurality of conductors extending through said housing, whereby conductors not in said subset pass through said housing electrically isolated from conductors in said subset.

5. The office partition system of claim 1, further comprising a second header tile mounted to an opposite side of said frame from said header tile, said header tiles and said elongate horizontal bracket together defining a pair of opposite vertical channels into which said vertical frame members are respectively received.

6. The office partition system of claim 1, wherein said elongate bracket includes a pair of opposite web ends disposed in respective abutment with interior faces of said vertical frame members.

* * * * *